(No Model.)

E. E. HUGHES.
COMBINED COTTON PLANTER AND SEED SOWER.

No. 309,464. Patented Dec. 16, 1884.

WITNESSES

INVENTOR
E. E. Hughes
by Anderson & Smith
his Attorneys

United States Patent Office.

EDWARD EVERETT HUGHES, OF BRUNSWICK, TENNESSEE.

COMBINED COTTON-PLANTER AND SEED-SOWER.

SPECIFICATION forming part of Letters Patent No. 309,464, dated December 16, 1884.

Application filed May 27, 1884. (No model.)

*To all whom it may concern:*

Be it known that I, EDWARD E. HUGHES, a citizen of the United States, residing at Brunswick, in the county of Shelby and State of Tennessee, have invented certain new and useful Improvements in a Combined Cotton-Planter and Seed-Sower; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
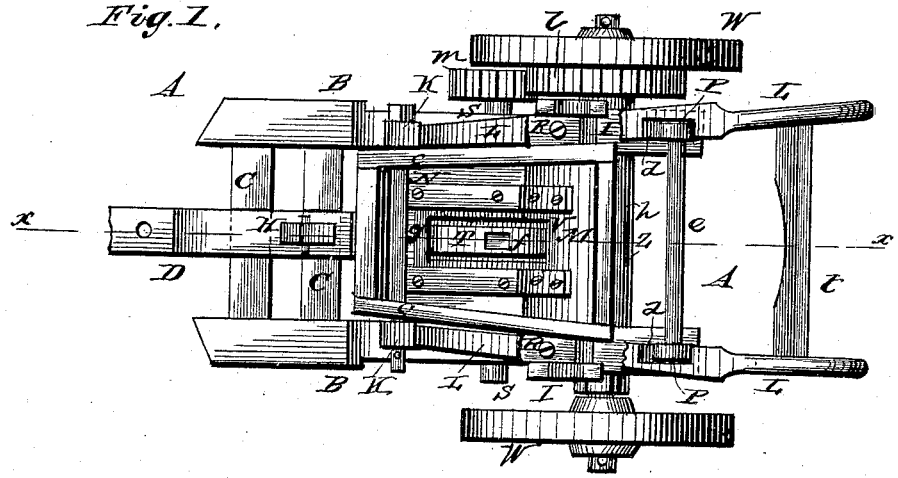
Figure 2:
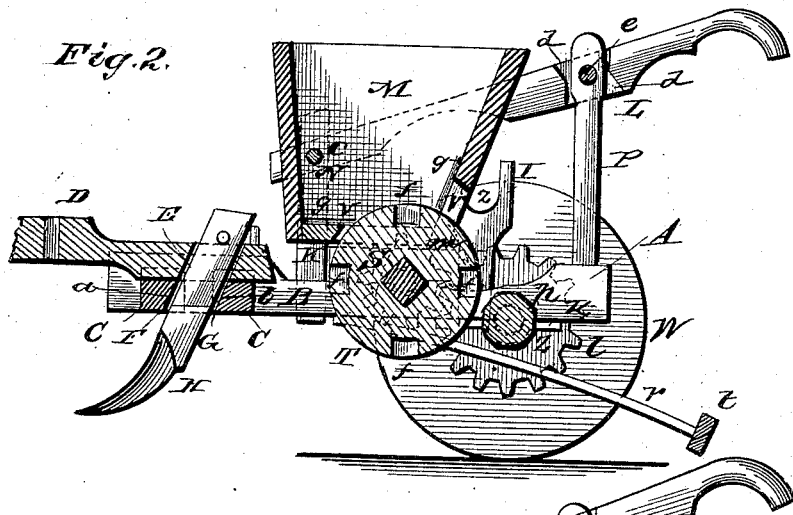
Figure 3:
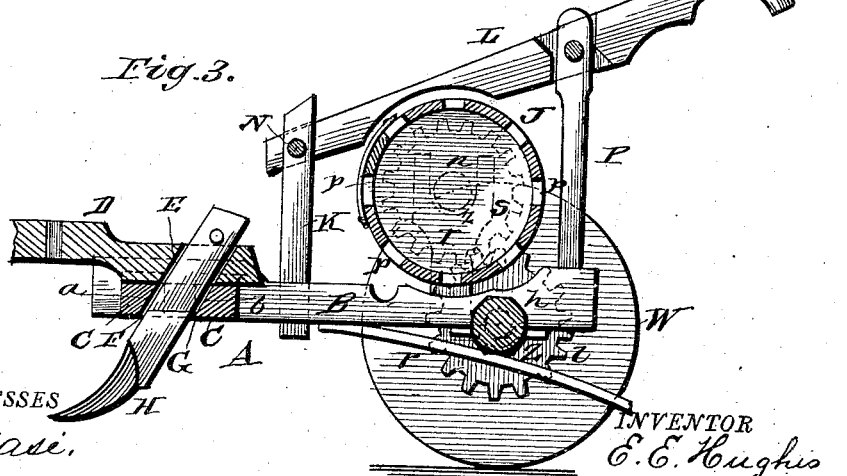

Figure 1 of the drawings is a top view of my device, and Figs. 2 and 3 are vertical sectional views of the same.

This invention has relation to machines for planting corn, sorghum, cotton-seed, peas, &c., and distributing fertilizing material; and the invention consists in the construction and novel arrangement of devices, as hereinafter set forth, and pointed out in the appended claims.

In the accompanying drawings, the letter A designates the main frame, having the side bars, B B, connected in front by the parallel transverse bars C C, which are centrally recessed to receive the draft block or head D. In this draft-block is made an oblique slot, E, and in line with the front wall of said slot is made a recess, F, in the front bar, C, the front wall, *a*, of said recess being inclined. In the rear bar, C, is also formed a recess, G, the rear wall of which (indicated at *b*) is inclined so that it is in line with the rear wall of the oblique slot E. The slot and recesses form the seat for the shank of the opener H.

To the side bars, B B, are secured uprights K K, which receive the front ends of the handles L L, said handles being connected thereto by a long transverse fastening-rod, N, which passes through bearings *c* in the seed-hopper M, which is seated between the uprights K K. To the rear ends of the side bars are secured uprights P P, the upper ends of which engage angular recesses or seats *d*, made in the inner sides of the handles. To these uprights the handles are pivoted by means of the transverse rod *e*. When the bolt N is withdrawn from the front of the handles, the angular walls of the seats *d* allow said handles to be thrown upward sufficiently to permit the removal of the seed-hopper M.

Between the uprights K and P, on each side bar, is secured the shaft-bearing R, which is adapted to be removed, when necessary, by withdrawing the fastening screws or bolts connecting it to the side bar. The shaft S is squared in its middle portion to receive the dropping-disk T, which is provided with the pockets *f* in its margin, whereby the corn or other grain or seed is taken from the hopper, carried back in view of the operator following the machine, and discharged in the opening or furrow made by the plate in front. This disk T works through an angular slot, V, made partly in the bottom of the hopper and partly in the rear wall thereof, as shown. Brushes *g*, arranged around said slot V, serve to clear the disk, and to prevent the seed from escaping through the slot between its walls and the surface of the disk. The seed carried back by the disk T falls between said disk and the prismatic portion *h* of the axle Z, which extends between the axle-bearings *k* of the side bars, in which the journal portions of said axle turn. The axle therefore turns with the wheels, and assists in giving the seed the proper direction as it falls from the pockets of the disk T, which is located just in front of the axle.

W W indicate the wheels, one of which is provided with a circular series of teeth, *l*, to engage a gear-wheel, *m*, on the end of the disk-shaft in front of the axle.

J represents the transverse drum, in which are placed cotton-seed or fertilizing substances for dropping. The journals *n* of the drum are secured to the ends thereof, and a series of openings, *p*, is made around its middle portion for the discharge of the fertilizer or cotton-seed as the drum rotates from front to rear, being driven by the engagement of the gear-wheel *s* on one of its journals with the teeth of the drive-wheel. Uprights I are provided on the side bars, B B, of the frame, and have bearings *z* in their upper portions to receive the journals of the drum, which may be placed in position for operation between said uprights when the hopper M has been removed.

To the side bars, B, are secured the elastic arms r of the coverer-bar t, which, following the machine, draws the soil over the seed.

Having described this invention, what I claim, and desire to secure by Letters Patent, is—

1. The combination, with the uprights P P, rising from the rear ends of the side bars of the frame, and the uprights K K, rising from the front portions of said side bars, of the handles having angular recesses to engage the uprights P P, and the transverse fastening-rods e and N, substantially as specified.

2. The combination, with the angularly-slotted hopper and its seed-disk, of the disk-shaft provided with a gear-wheel directly engaging the teeth of the drive-wheel, and the rotating axle of said drive-wheel having a prismatic portion between its journals and following the seed-disk, substantially as specified.

In testimony whereof I affix my signature in presence of two witnesses.

EDWARD EVERETT HUGHES.

Witnesses:
C. G. HUGHES,
J. N. MOORE.